March 3, 1959
P. W. HARBAUGH
2,875,636
POSITIVE GEAR DRIVE CONTROL MECHANISM
Filed Nov. 14, 1957
6 Sheets-Sheet 2
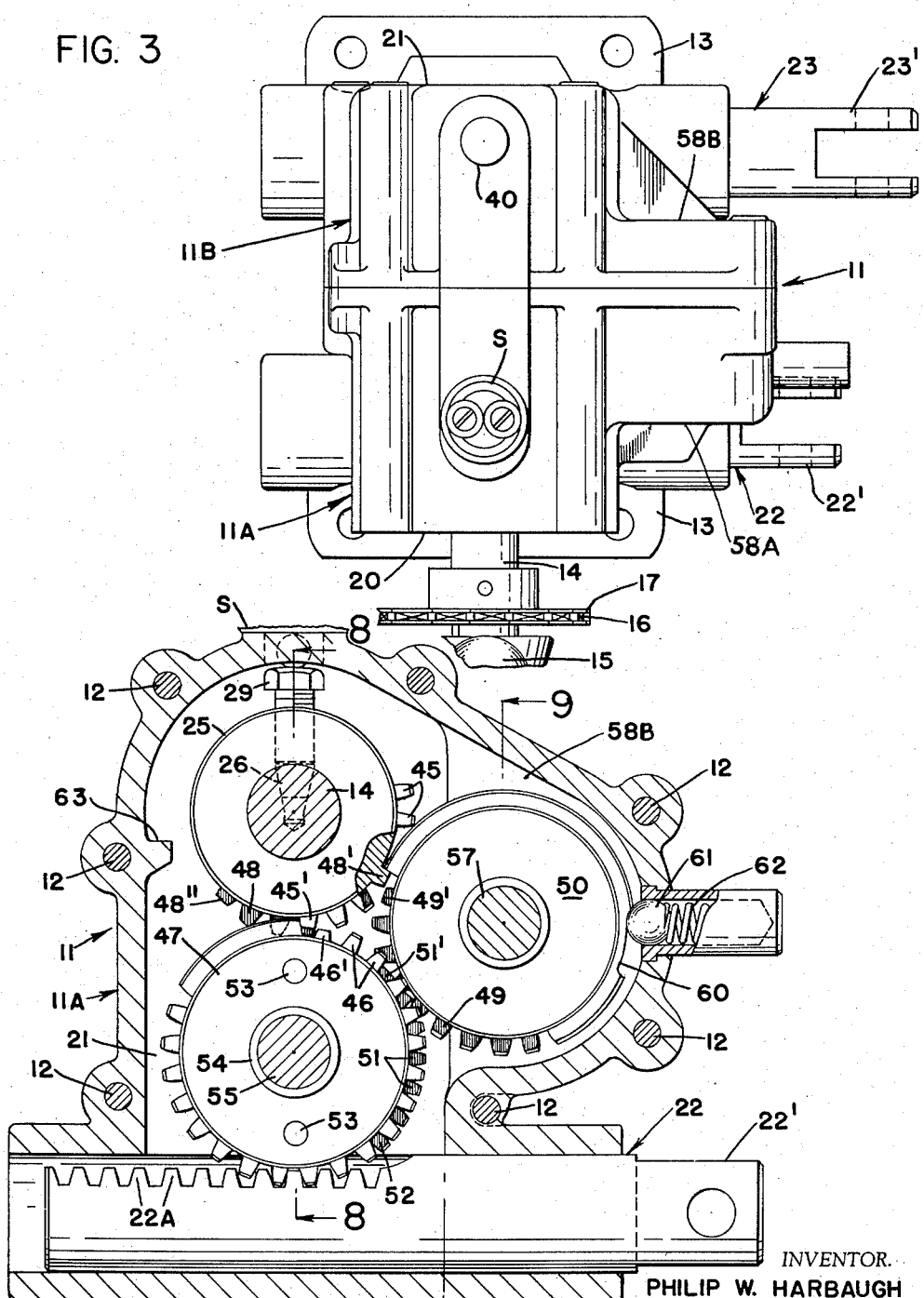
INVENTOR.
PHILIP W. HARBAUGH
BY
ATTORNEYS

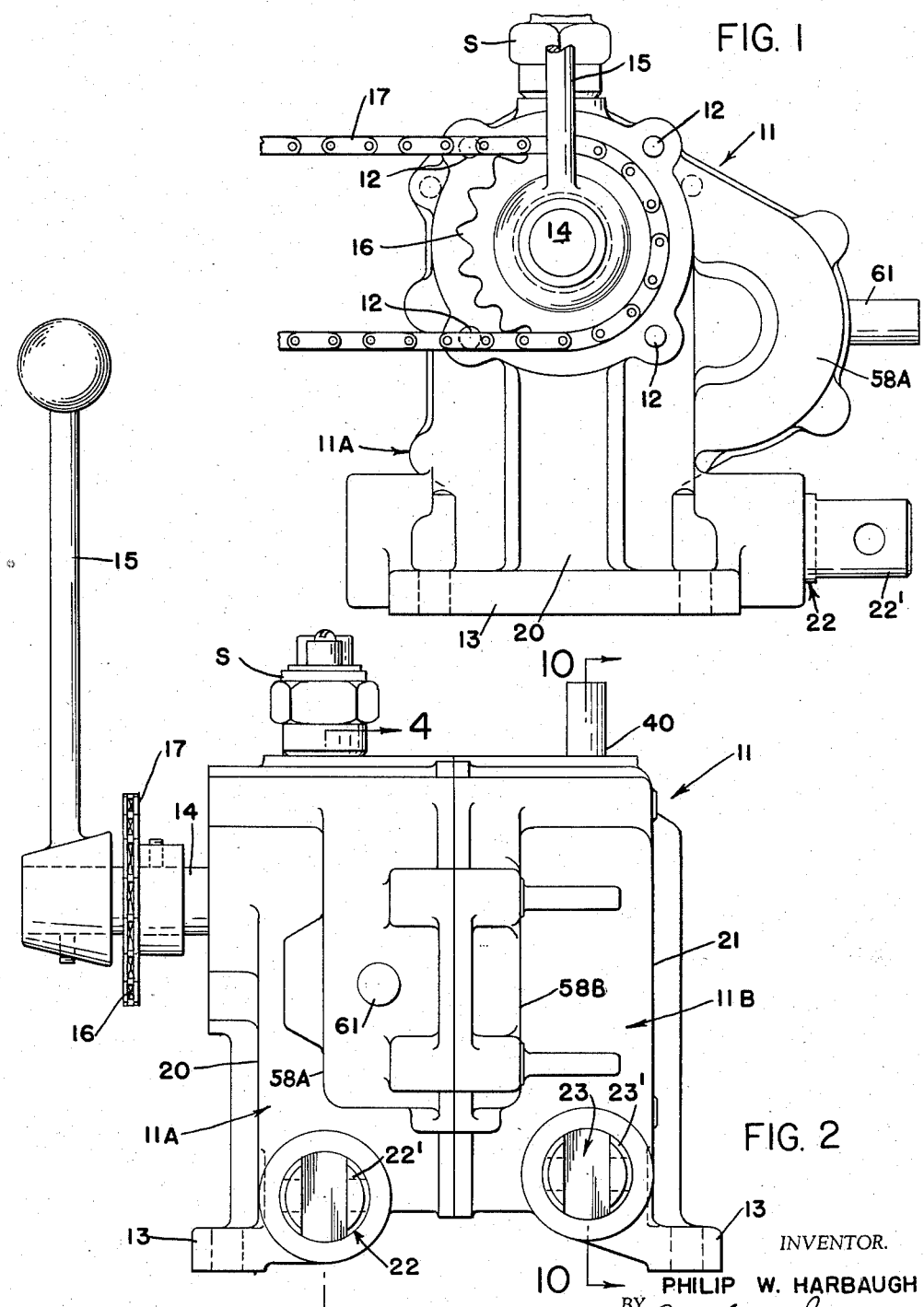

INVENTOR.
PHILIP W. HARBAUGH
BY
ATTORNEYS

March 3, 1959 P. W. HARBAUGH 2,875,636
POSITIVE GEAR DRIVE CONTROL MECHANISM
Filed Nov. 14, 1957 6 Sheets-Sheet 4

INVENTOR.
PHILIP W. HARBAUGH
BY
ATTORNEYS

March 3, 1959  P. W. HARBAUGH  2,875,636
POSITIVE GEAR DRIVE CONTROL MECHANISM
Filed Nov. 14, 1957  6 Sheets-Sheet 5

INVENTOR.
PHILIP W. HARBAUGH
BY
ATTORNEYS

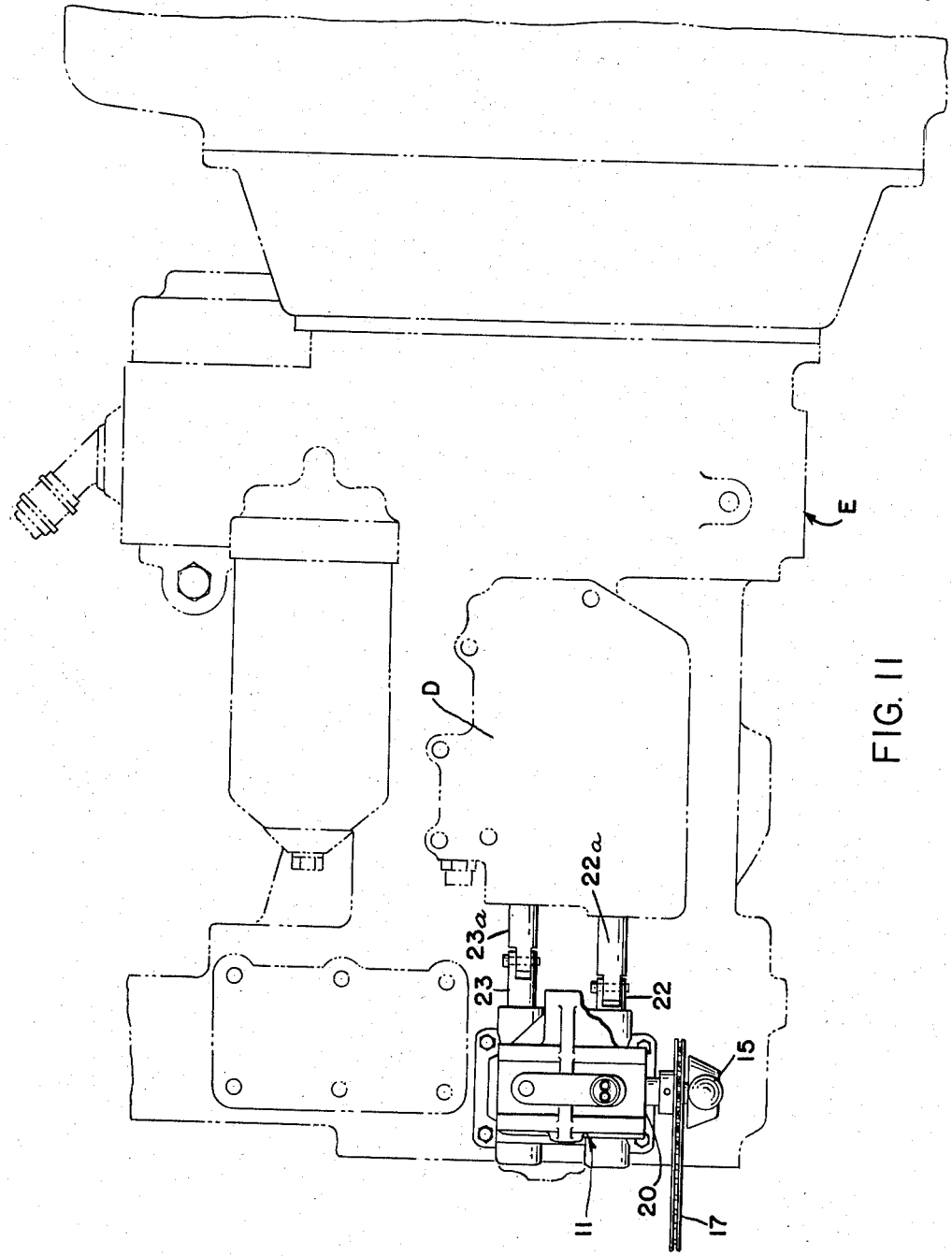

United States Patent Office 2,875,636
Patented Mar. 3, 1959

2,875,636

POSITIVE GEAR DRIVE CONTROL MECHANISM

Philip W. Harbaugh, Hudson, Ohio, assignor to The Morse Instrument Company, Hudson, Ohio, a corporation of Ohio Application November 14, 1957, Serial No. 696,356

12 Claims. (Cl. 74—472)

The invention relates generally to mechanism for operating the variable speed control of an engine or the like when driving in opposite directions.

More particularly, the invention relates to a single lever control mechanism for controlling the reverse gear and simultaneously controlling the speed control of an engine in either direction.

Certain prior mechanisms designed for this purpose have not been positive in action and have required separate control levers for the separate control functions of the mechanism.

The present invention is particularly adapted to simultaneously control the operation of the reversing gear clutch and the hydraulic gear ratio selector valve of an engine, in order to control the engine speed in either direction.

It is an object of the present invention to provide an improved positive gear drive mechanism for controlling the power ratio in either direction of an engine having a reversing gear.

Another object is to provide an improved control unit having a single lever for simultaneously controlling the reversing gear of an engine and the speed or power ratio of the engine in either direction.

The improved control mechanism preferably has an input shaft connected to a reversing element to operate the reversing gear clutch, a control element to operate the speed or power ratio control mechanism of an engine, and positive gear mechanism connected to said input shaft to drive said control element in one direction as said shaft is rotated from neutral in either direction.

The foregoing and other objects which will become apparent herein are accomplished by the improvements comprising the present invention, a preferred embodiment of which is shown by way of example in the accompanying drawing and described in detail herein. Various modifications and changes in details of construction are comprehended within the scope of the invention as defined in the appended claims.

In the drawings:

Fig. 1 is an end elevation of the improved control unit fitted with a sprocket and chain for operative connection with a remote control system, and showing the control lever in neutral position.

Fig. 2 is a side elevation thereof.

Fig. 3 is a top plan elevation thereof.

Fig. 4 is a transverse sectional view as on line 4—4 of Figs. 2 and 9.

Fig. 11 is a schematic view showing the control unit connected to the driving mechanism of a marine engine.

The improved control unit includes a housing 11 which is preferably in two mating parts 11A and 11B abutting each other along a transverse plane centrally of the unit, and normally held together by suitable bolts 12. Base flanges 13 are provided on the housing parts 11A and 11B for attaching the unit to a suitable support. The flanges 13 will be considered as located at the bottom of the unit for purposes of description, but it will be apparent that the unit may be mounted with said flanges at the side or top thereof.

Figures 8, 10:
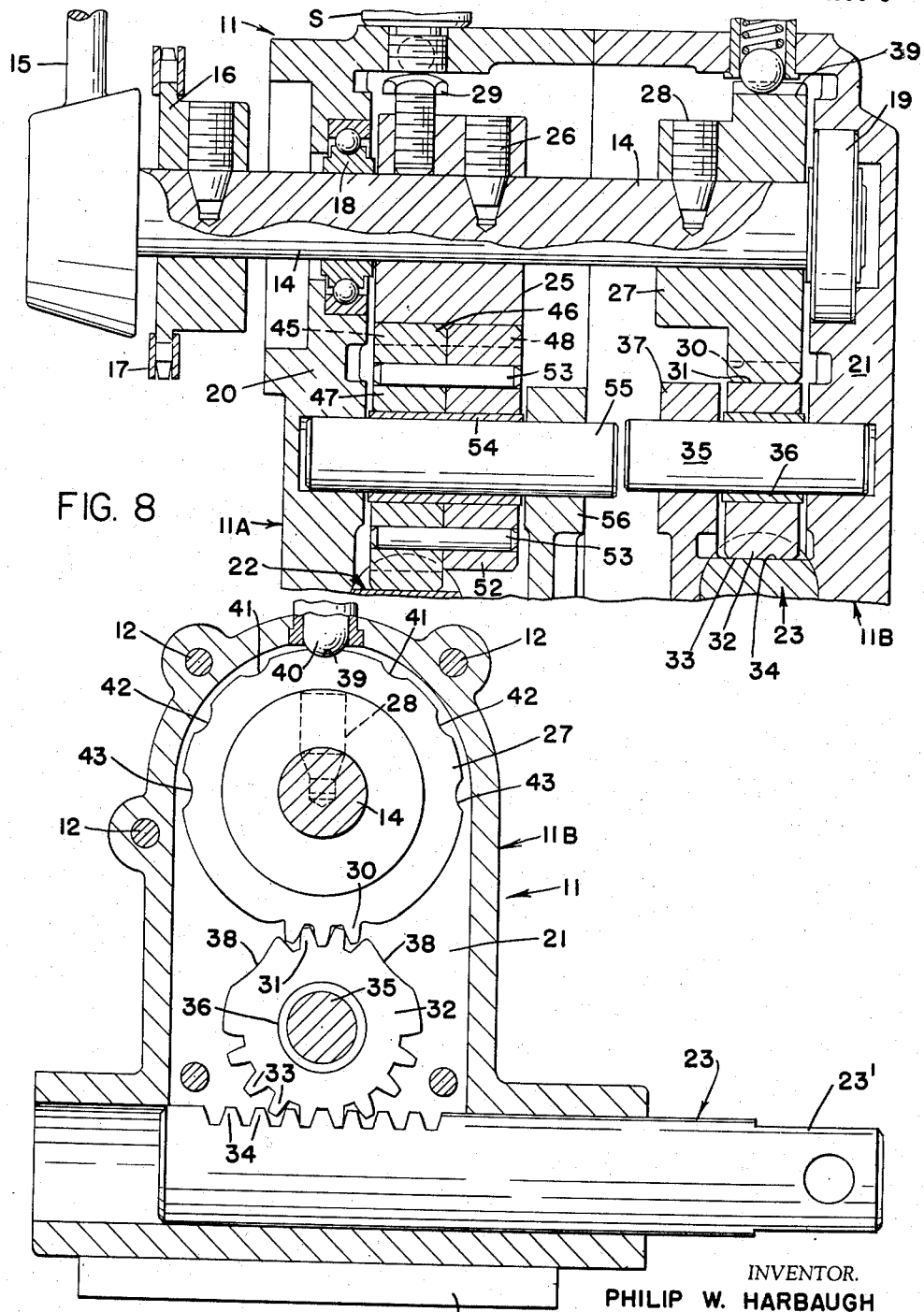
Fig. 8 is a vertical sectional view as on line 8—8 of Fig. 4.
Fig. 10 is a transverse sectional view as on line 10—10 of Fig. 2.

The input shaft 14 of the unit is journaled in the housing parts 11A and 11B, as best shown in Fig. 8, and preferably extends outwardly of the front end, as shown, for connection with a control lever 15. The extension of shaft 14 may also be provided with a sprocket 16 for operative connection with the chain 17 of a remote control system, as illustrated in Figs. 1–3. The input shaft is preferably journaled in antifriction bearings 18 and 19 in the front and rear walls 20 and 21, respectively, of the housing, and, if desired, the rear end of the shaft may be extended through the rear housing wall 21 for connection with a control element.

Figure 9:
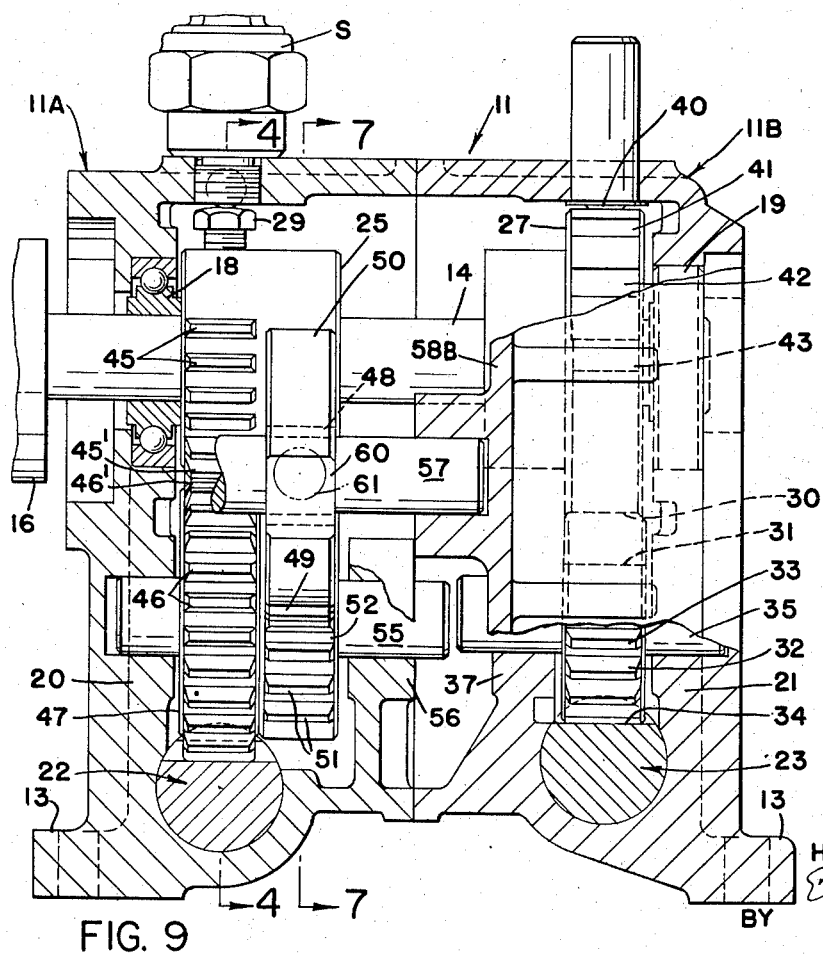
Fig. 9 is a fragmentary vertical sectional view as on line 9—9 of Fig. 4.

The element for operating the speed control mechanism of the engine is preferably a rack bar indicated at 22, and the element for operating the reverse gear clutch is preferably a rack bar indicated at 23. For the purpose of description in the specification and claims, the term "speed control" is intended to include a throttle control, or a power ratio control for the engine. Preferably, the racks 22 and 23 extend transversely of input shaft 14, as shown in Fig. 9, and project from one side of the housing near the bottom thereof. The racks preferably have clevises 22' and 23', respectively, formed on their outer ends, as shown in Figs. 2 and 3, for connection with the speed control and reverse gear control elements 22a and 23a, respectively, of the conventional engine E, as shown in Fig. 11. The elements 22a and 23a are connected to the driving mechanism or transmission D of the engine.

The input shaft 14 has a double width spur gear 25 secured thereon, as by a tapered set screw 26, for operating the rack 22, and has a single width spur gear 27 secured thereon, as by a tapered set screw 28, for operating the rack 23. The shaft 14 is adapted to rotate 90° in either direction from its neutral position, and a stop screw 29 may be screwed in gear 25 to limit rotation at 90° in either direction by contacting suitable abutments to be described. The stop screw 29 may be arranged to actuate a safety starter switch S in series with the ignition circuit for the engine, so that when the shaft 14 is in neutral the ignition circuit is automatically closed.

As shown in Fig. 10, the spur gear 27 is preferably a mutilated or interrupted gear having a toothed segment 30 which, in the neutral position of shaft 14 meshes with a toothed segment 31 on a mutilated gear 32 which has teeth 33 meshing with teeth 34 on the rack bar 23 for driving the same. The mutilated gear 32 is preferably journaled on a stub shaft 35 by a bushing 36, the ends of shaft 35 being supported in housing part 11B. As shown in Fig. 8, one end of shaft 35 may be supported in housing wall 21, and the other end in a bracket 37 extending upwardly from the base of the housing.

When the shaft 14 is rotated 30° in either direction from the neutral position of Fig. 10, the meshing gears 27 and 32 move the rack 23 linearly a sufficient amount to engage the reverse gear clutch or control of the engine in forward or reverse driving position, and as the shaft is rotated in either direction beyond the 30° point, the gear segments 30 and 31 become unmeshed and no further movement is imparted to the rack 23. However, as the shaft rotates beyond 30° in either direction, the cylindrical surface of gear 27 rotatively engages one or the other of the arcuate faces 38 of gear 32, so that the rack 23 is maintained in clutch engaging position.

Instead of the mutilated gears 27 and 32, a well-known Geneva cam mechanism having meshing drive elements on the shafts 14 and 35 may be employed to obtain substantially the same result of engaging the reverse gear clutch during the first part of the rotation of the input shaft in either direction and maintaining it engaged during further rotation.

The gear 27 is provided with a notch 39 adapted to be engaged by a spring-biased ball detent 40 when the shaft 14 is in neutral position, and with notches 41 at the 30° positions. Other notches 42 are provided in gear 27 at the 60° positions and notches 43 at the 90° positions, for a purpose to be described.

Referring to Figs. 4, 8 and 9, the double width spur gear 25 has a front series of teeth 45 which mesh with the teeth 46 on a front gear section 47, and the teeth 46 mesh with teeth 22A on rack 22 to drive the rack linearly to the right when the shaft 14 and gear 25 are rotated clockwise from neutral position, as viewed in Fig. 4. The gear 25 has an axially spaced rear series of teeth 48 which mesh with the teeth 49 on an idler gear 50, and the teeth 49 mesh with the teeth 51 on a rear gear section 52 fixed to and axially spaced from the front section 47, to drive the rack to the right when the shaft 14 and gear 25 are rotated counterclockwise. The teeth 48, 49 and 51 are shaded in Figs. 4–6 for the purpose of clarification.

The gear sections 47 and 52 are preferably made separately as their teeth are staggered with respect to each other, and the sections are secured together by pins 53 or the like, the sections being preferably journaled by means of a sleeve bearing 54 on a stub shaft 55 supported at one end in front housing wall 20 and at the other end in a bracket 56 rising from the base of the housing. The idler gear 50 is preferably journaled on a stub shaft 57 having its front end supported in a web 58A of housing part 11A and its rear end in a web 58B of housing part 11B.

Figure 5:
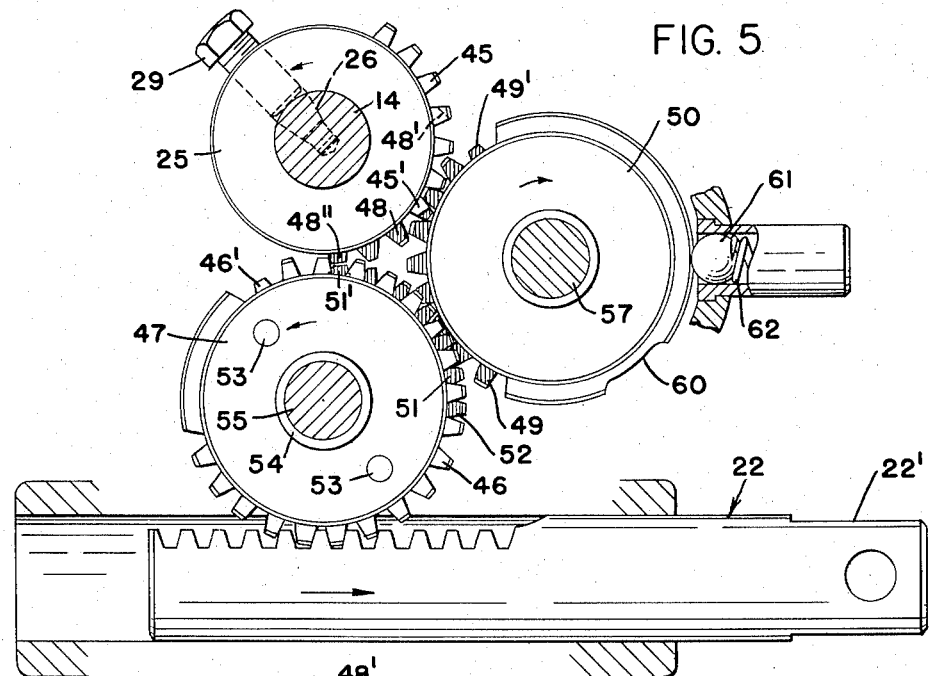
Fig. 5 is a schematic view similar to Fig. 4, showing the positon of the gearing when the control lever is rotated counterclockwise 45°.
Figure 6:
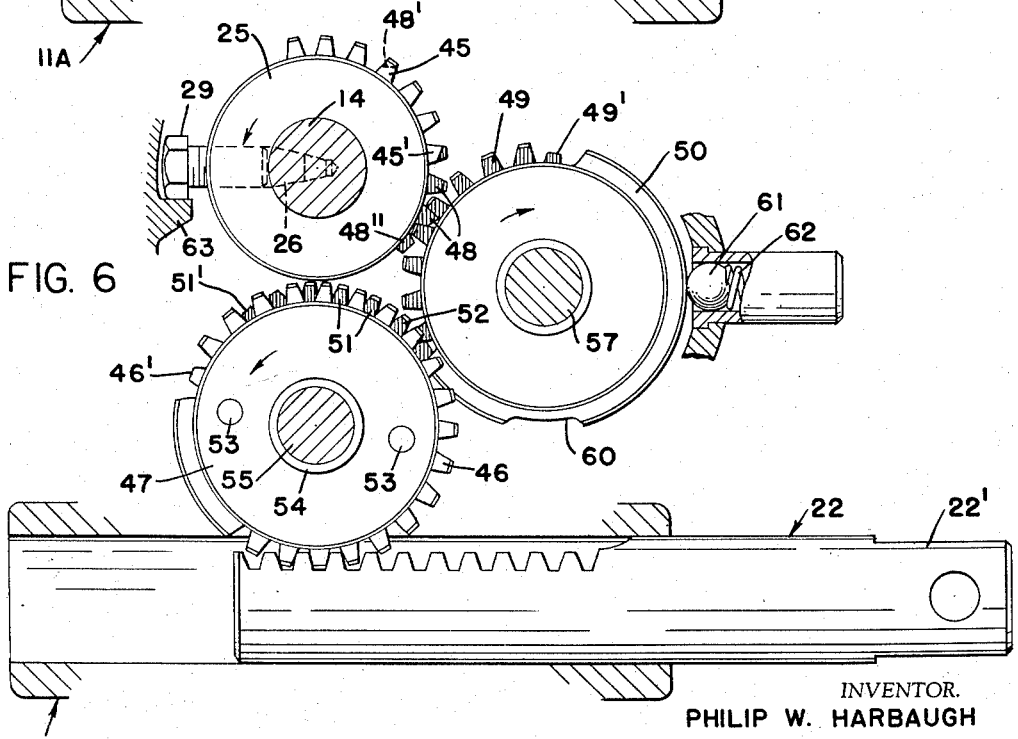
Fig. 6 is a schematic view similar to Fig. 5, showing the position of the gearing when the control lever is rotated counterclockwise 90°.

As shown in Figs. 4–6, the lowermost tooth 45' of the front series on gear 25 is clipped or shortened radially, as is the uppermost tooth 46' on front gear section 47, so that when the gear 25 is rotated counterclockwise, the tooth 45' passes by tooth 46' and front gear 47 is not rotated by gear 25. Similarly, as best shown in Fig. 7, the uppermost tooth 48' of the rear series on gear 25 is clipped, as is the uppermost tooth 49' on gear 50, so that when the gear 25 is rotated clockwise tooth 48' passes by tooth 49' and the idler gear 50 is not rotated by gear 25.

The idler gear is provided with a peripheral notch 60 for receiving a ball detent 61 mounted in the housing and biased toward the idler gear by a spring 62, and as shown in Fig. 4 when the gears are in neutral position the ball 61 engages the rounded upper end of the notch 60 to yieldingly hold the gear 50, as well as gears 25 and 47, in neutral position.

Figure 7:
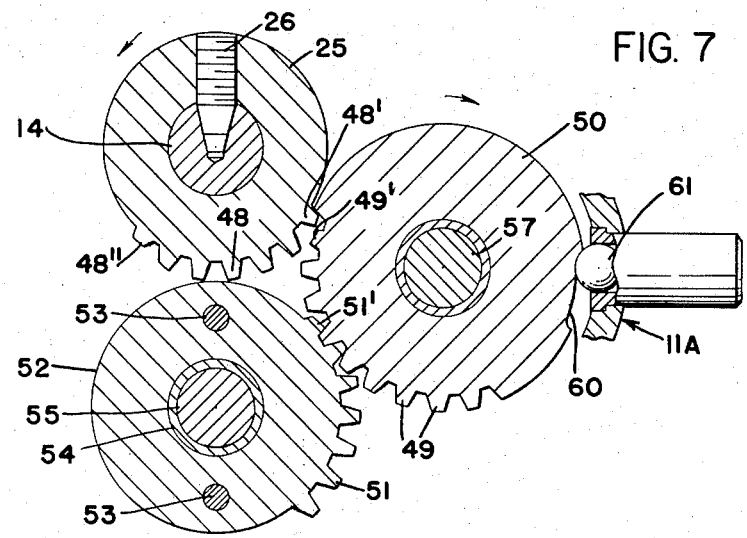
Fig. 7 is a schematic sectional view as on line 7—7 of Fig. 9, showing the position of the gearing when the control lever is in neutral position.

In the operation of the improved mechanism, starting with the gears in the neutral position of Figs. 4 and 7, if the shaft 14 is rotated counterclockwise by the control lever 15, clipped tooth 45' passes by clipped tooth 46' but rear clipped tooth 48' on gear 25 engages idler gear 50 and the teeth 48 mesh with teeth 49' and 49 to rotate gear 50 clockwise. The last rear tooth 48" on gear 25 and the first or uppermost tooth 51' on rear gear section 52 are clipped so that they can pass by each other at the 45° position of gear 25 shown in Fig. 5. As the idler gear 50 is rotated clockwise by the rear teeth 48 on gear 25, the teeth 49 mesh with the teeth 51, rotating the gears 52 and 47 counterclockwise and driving the rack 22 to the right as viewed in the drawings to actuate the speed control element 22a of the engine.

If the shaft 14 is rotated clockwise by the control lever 15, the tooth 45' engages gear 47 and teeth 45 mesh with the teeth 46' and 46 to rotate gear 47 counterclockwise and drive the rack to the right in the same direction as when the shaft 14 is rotated counterclockwise. The teeth 51 of rear gear section 52 are always in mesh with teeth 49 on idler gear 50, so that counterclockwise rotation of gear 47 and rear gear 52 by rotating gear 25 clockwise will cause clockwise rotation of idler gear 50, but teeth 48' and 49' will pass by each other and teeth 48 and 49 do not mesh.

As the gear 25 is returned to neutral position from rotation in either direction, the idler gear will be rotated counterclockwise back toward its neutral position. Referring to Fig. 5, as the upper edge of the detent notch 60 passes under the ball 61, the spring pressure on the ball will urge it into seating engagement with the upper curved portion of the notch 60. The force of spring 62 is sufficient to move the rack bar 22 by rotation of gears 50 and 47. This provides the final increment of movement to position all the gears in exact neutral position, thus preventing the possibility of gear 25 meshing with both gears 47 and 50 simultaneously. The detent also serves to remove all back-lash in the gears in neutral position.

Referring to Fig. 10, the notches 41, 42 and 43 are yieldingly engaged by ball detent 40 at 30°, 60° and 90° of rotation of the shaft 14 in either direction, at which positions the rack bar 22 moves the power or speed ratio control mechanism of the engine to which it is operatively connected to low, intermediate and high ranges, respectively, and the operator can determine these positions by feel as the detent engages the respective notches.

The stop screw 29 limits rotation of the shaft 14 beyond 90° in a counterclockwise direction by abutting the projection 63 on the housing, and in a clockwise direction by abutting a similar projection (not shown).

The improved mechanism provides a positive gear drive without any lost motion for controlling the speed or power ratio in either direction of an engine, and both the ratio control and reversing gear clutch can be simultaneously controlled by operation of a single lever.

Obviously, both the mutilated gear 32 and the front gear 47 could have their shafts connected by lever arms instead of racks to the reverse gear clutch and throttle control mechanism respectively of an engine which does not have a definite 3-stage gear ratio control mechanism.

What is claimed is:

1. Control mechanism for the reversing gear clutch and speed control of an engine, comprising an operating shaft, a reversible element for operating said reversing gear clutch, means operatively connecting said reversible element to said shaft, a speed control element for operating the speed control mechanism of said engine, and two gear trains in different planes selectively connecting said shaft to said speed control element for driving the speed control element in one direction as the shaft is rotated from neutral in either direction.

2. Control mechanism for the reversing gear clutch and speed control of an engine, comprising an operating shaft, a reversible element for operating said reversing gear clutch, means connecting said reversible element to said shaft for engaging said clutch during partial rotation of said shaft in either direction and maintaining said clutch engaged during further rotation of the shaft in the same direction, a speed control element for operating the speed control mechanism of said engine, and two gear trains in different planes selectively connecting said shaft to said speed control element for driving the speed control element in one direction as the shaft is rotated from neutral in either direction.

3. In a control mechanism for the reversing gear clutch and speed control of an engine, a reversely rotatable shaft for causing engagement of the clutch in forward and reverse, a control element adapted to change the speed of the engine when moved in one direction, and two gear trains in different planes selectively connecting said shaft to said speed control element for driving said element in one direction as the shaft is rotated from neutral position in either direction.

4. In a control mechanism for the reversing gear clutch and speed control of an engine, a reversely rotatable shaft for causing engagement of the clutch in forward and reverse, a speed control element adapted to change the speed of the engine when moved in one direction, a first gear on said shaft having two side-by-side series of teeth, a second gear operatively connected to said speed control element and having two side-by-side series of teeth one of which meshes with one series of said first gear only when said first gear is rotated in one direction, an idler gear having teeth meshing with the other series on the second gear and adapted to mesh with the other series on the first gear only when it is rotated in the opposite direction, whereby the second gear is always rotated in the same direction while the first gear is rotated from neutral in either direction.

5. In a control mechanism for the reversing gear clutch and speed control of an engine, a reversely rotatable shaft for causing engagement of the clutch in forward and reverse, a speed control element adapted to change the speed of the engine when moved in one direction, a first gear on said shaft having two side-by-side series of teeth, a second gear operatively connected to said speed control element and having two side-by-side series of teeth one of which meshes with one series of said first gear only when said first gear is rotated in one direction, an idler gear having teeth meshing with the other series on the second gear and adapted to mesh with other series on the first gear only when it is rotated in the opposite direction, whereby the second gear is always rotated in the same direction while the first gear is rotated from neutral in either direction, and means yieldingly holding said idler gear in neutral position.

6. In a control mechanism for the reversing gear clutch and speed control of an engine, a housing, an operating shaft reversely rotatable in said housing for causing engagement of the clutch in forward and reverse, a speed control element movably mounted in said housing and adapted to change the speed of the engine when moved in one direction, a gear on said shaft having two axially spaced series of teeth, a second gear operatively connected to said speed control element and having two axially spaced series of teeth one series of which meshes with one series on said first gear only when said operating shaft is rotated in one direction, an idler gear having teeth meshing with the other series on said second gear and adapted to mesh with the other series on said first gear only when said shaft is rotated in the opposite direction, whereby said second gear is always rotated in the same direction while said shaft is rotated from neutral in either direction.

7. In a control mechanism for the reversing gear clutch and speed control of an engine, a housing, an operating shaft reversely rotatable in said housing for causing engagement of the clutch in forward and reverse, a speed control element movably mounted in said housing and adapted to change the speed of the engine when moved in one direction, a gear on said shaft having two axially spaced series of teeth, a second gear operatively connected to said speed control element and having two axially spaced series of teeth one series of which meshes with one series on said first gear only when said operating shaft is rotated in one direction, an idler gear having teeth meshing with the other series on said second gear and adapted to mesh with the other series on said first gear only when said shaft is rotated in the opposite direction, whereby said second gear is always rotated in the same direction while said shaft is rotated from neutral in either direction, and spring detent means in said housing yieldingly holding said idler gear in neutral position.

8. In a control mechanism for the reversing gear clutch and speed control of an engine, a housing, an operating shaft reversely rotatable in said housing for causing engagement of the clutch in forward and reverse, a speed control element movably mounted in said housing and adapted to change the speed of the engine when moved in one direction, a gear on said shaft having two axially spaced series of teeth, a second gear operatively connected to said speed control element and having two axially spaced series of teeth one series of which meshes with one series on said first gear only when said operating shaft is rotated in one direction, said meshing series having opposed clipped teeth passing by each other when said operating shaft is rotated in the opposite direction, an idler gear having teeth meshing with the other series of said second gear and adapted to mesh with the other series on said first gear only when said shaft is rotated in the opposite direction, said idler gear teeth and said other series of the first gear having opposed clipped teeth passing by each other when the operating shaft is rotated in said one direction, whereby said second gear is always rotated in the same direction while said shaft is rotated from neutral in either direction.

9. In a control mechanism for the reversing gear clutch and speed control of an engine, a housing, an operating shaft reversely rotatable in said housing for causing engagement of the clutch in forward and reverse, a speed control element movably mounted in said housing and adapted to change the speed of the engine when moved in one direction, a gear on said shaft having two axially spaced series of teeth, a second gear operatively connected to said speed control element and having two axially spaced series of teeth one series of which meshes with one series on said first gear only when said operating shaft is rotated in one direction, said meshing series having opposed clipped teeth passing by each other when said operating shaft is rotated in the opposite direction, an idler gear having teeth meshing with the other series of said second gear and adapted to mesh with the other series of said first gear only when said shaft is rotated in the opposite direction, said idler gear teeth and said other series of the first gear having opposed clipped teeth passing by each other when the operating shaft is rotated in said one direction, whereby said second gear is always rotated in the same direction while said shaft is rotated from neutral in either direction, and spring detent means in said housing yielding holding said idler gear in neutral position.

10. Control mechanism for the reversing gear clutch and speed control of an engine, comprising a housing, an operating shaft journaled in said housing, a first rack bar linearly movable in said housing and adapted when moved in opposite directions to cause engagement of said clutch in forward and reverse positions, means selectively connecting said first rack bar to said operating shaft during part of the rotation of said shaft from neutral in either direction, a second rack bar linearly movable in said housing, and gear means positively connecting said operating shaft to said second rack bar for moving it in one direction as said shaft is rotated from a neutral position in either direction.

11. Control mechanism for the reversing gear clutch and speed control of an engine, comprising a housing, an operating shaft journaled in said housing, a first rack bar linearly movable in said housing and adapted when moved in opposite directions to cause engagement of said clutch in forward and reverse positions, means selectively connecting said first rack bar to said operating shaft during part of the rotation of said shaft from neutral in either direction, a second rack bar linearly movable in said housing, a first gear on said shaft having two axially spaced series of teeth, a second gear engaging said second rack bar and having two axially spaced series of teeth one series of which meshes with one series on said first gear only when said operating shaft is rotated in one direction, and an idler gear having teeth meshing with the other series on said second gear and adapted to mesh with the other series on said first gear only when said shaft is rotated in the opposite direction, whereby said second rack is always driven in the same direction while said shaft is rotated from neutral in either direction.

12. Control mechanism for the reversing gear clutch and speed control of an engine, comprising a housing, an operating shaft journaled in said housing, a first rack bar linearly movable in said housing and adapted when moved in opposite directions to cause engagement of said clutch in forward and reverse positions, means selectively connecting said first rack bar to said operating shaft during part of the rotation of said shaft from neutral in either direction, a second rack bar linearly movable in said housing, a first gear on said shaft having two axially spaced series of teeth, a second gear engaging said second rack bar and having two axially spaced series of teeth one series of which meshes with one series on said first gear only when said operating shaft is rotated in one direction, said meshing series having opposed clipped teeth at one end passing by each other when said shaft is rotated in the opposite direction, and an idler gear having teeth meshing with the other series on said second gear and adapted to mesh with the other series on said first gear only when said shaft is rotated in the opposite direction, said idler gear teeth and said other series of the first gear having opposed clipped teeth passing by each other when the operating shaft is rotated in said one direction, whereby said second rack is always driven in the same direction while said shaft is rotated from neutral in either direction, and spring detent means in said housing yieldingly holding said idler gear in neutral position.

References Cited in the file of this patent

UNITED STATES PATENTS

| | | |
|---|---|---|
| 2,056,006 | Hodgkins | Sept. 29, 1936 |
| 2,254,144 | Higgins | Aug. 26, 1941 |
| 2,588,650 | Morse | Mar. 11, 1952 |
| 2,804,782 | Erxleben | Sept. 3, 1957 |